ered by the Government of the United States of America for governmental purposes without the payment of any royalties thereon or therefor.

United States Patent [19]

Marrone

[11] 4,413,184

[45] Nov. 1, 1983

[54] OPTICAL FIBER RADIATION DETECTOR AND REAL-TIME DOSIMETER

[75] Inventor: Michael J. Marrone, Severna Park, Md.

[73] Assignee: The United States of America as represented by the Secretary of the Navy, Washington, D.C.

[21] Appl. No.: 262,658

[22] Filed: May 11, 1981

[51] Int. Cl.³ .................. G01T 1/20; H05B 33/00; G02B 5/14
[52] U.S. Cl. .................. 250/368; 250/484.1; 350/96.10
[58] Field of Search .................. 250/368, 369, 474.1, 250/483.1, 484.1; 350/96.10, 96.30, 96.31, 96.34

[56] References Cited

U.S. PATENT DOCUMENTS

| | | |
|---|---|---|
| 2,787,714 | 4/1957 | Schulman et al. . |
| 2,934,651 | 4/1960 | Etzel et al. . |
| 2,957,080 | 10/1960 | Schulte et al. . |
| 2,972,051 | 2/1961 | Baum . |
| 3,089,957 | 5/1963 | Bishay . |
| 3,578,973 | 5/1971 | Dooley et al. . |
| 4,229,069 | 10/1980 | Motin et al. .................. 350/96.30 |

OTHER PUBLICATIONS

P. Kaiser, "Drawing-induced Coloration in Vitreous Silica Fibers", *J. of Optical Society*, vol. 64, No. 4, Apr. 1974.
"New Real-Time Dosimeters Use Fiber Optics", *NRL R&D Highlights*, vol. 1, No. 1, Dec. 1974.
"Drawing-induced Defect Centers in a Fused Silica Core Fiber", *Applied Physics Letters*, vol. 28, No. 9, May 1, 1976.

*Primary Examiner*—Janice A. Howell
*Attorney, Agent, or Firm*—Robert F. Beers; William T. Ellis; Kenneth E. Walden

[57] ABSTRACT

An optical fiber dosimeter for monitoring by luminescence the presence of ionizing radiation and measuring a cumulative dose from around reactors, accelerators and waste storage areas. A length of silica core optical fiber in the presence of ionizing radiation has been found to luminesce in two distinct emission bands, one with a peak around 450 nm (blue) and the other with a peak around 650 nm (red). The intensity of the red luminescence is proportional to the intensity of ionizing radiation on the fiber whereas the intensity of blue luminescence is proportional to both the intensity of ionizing radiation on the fiber and the accumulated ionizing radiation history or dosage on the fiber. A device constructed according to the invention may be employed to surround an area of a human body tissue or organ undergoing radiation treatment as an aid in directing the radiation.

18 Claims, 5 Drawing Figures

OPTICAL FIBER RADIATION DETECTOR AND REAL-TIME DOSIMETER

BACKGROUND OF THE INVENTION

Glass darkens upon exposure to ionizing radiation. When the glass is in the form of an optical fiber, the amount of light capable of being transmitted through the fiber varies as a function of the amount of ionizing radiation that has accumulated in the fiber. This principal has been proposed as a basis for the construction of a device for measuring radiation dosage. Optical fibers may be wound on a mandrel or around an open core to provide considerable length exposure to radiation. Such devices are discussed in U.S. Pat. No. 2,972,051 issued Feb. 14, 1961 to John W. Blum entitled "Pocket Radiation Dosimeter", and in NRL R&D HIGHLIGHTS, December 1974, entitled "New Real-Time Dosimeters Use Fiber Optics". By providing optical fibers of considerable length there is in effect an extension or elongation of the material which the ionizing radiation strikes, and which the transmitted light must traverse.

The impingement of ionizing radiation on the glass optical fiber results in alteration of the light absorbing properties as a function of the quality and quantity of radiation. By comparing light absorbed in the optical fiber before and after exposure, it is possible to measure the accumulated radiation dose. However, dosimeters relying upon the above principle have not been altogether satisfactory. The relation between fiber coloration or optical density falls off rapidly as soon as the radiation ceases due to fading of the coloration.

The most extensively studied effect of ionizing radiation on optical fibers has been signal attenuation due to production of defect centers which absorb the light transmitted through the fibers. Another important effect of radiation not so thoroughly studied is the luminescence generated in optical fiber waveguides during or immediately following exposure to radiation. The present invention relates to the use of the dose-dependent behavior of luminescence produced in silica core fibers during and after exposure to ionizing radiation.

The observation of intense luminescence at around 450 nm in fused silica at 4.2K immediately following irradiation with a pulse of 600 keV electrons is reported by George H. Sigel, Jr. in J. Non-Cryst. Solids, 13, 372 (1973/74). An emission centered at 450 nm from α-Quartz at 85K under gamma ray stimulation is reported in Radiation Effects, 26, 237 (1975). Luminescence at around 450 nm in Ge-doped optical fibers under electron irradiation is reported in IEEE, Trans. Nucli. Sci. NS-21, 113 (1974).

There is disclosed herein a new ionizing radiation induced emission band at 650 nm (in addition to the 450 nm band) which is characterized by a strikingly different dose-dependence of its intensity relative to the 450 nm intensity and how the two bands are employed for detecting immediate radiation and cummulative radiation.

SUMMARY OF THE INVENTION

This invention relates to a radiation detector and real-time radiation dosimeter. It employs a considerable length of silica core optical fiber looped or otherwise disposed about an area susceptible of receiving high energy radiation. Ends of the optical fiber extend from the looped fiber to a remote location where luminescent readings may be taken. Upon receiving ionizing radiation, the optical fiber luminesces at its ends in two distinct emmission bands, blue at a peak of around 450 nm and red at a peak of around 650 nm. The fiber luminescence is focused into the entrance slit of a grating monochromator which separates it into the red and blue bands. Outputs from the monochromator are detected by a photomultiplier tube.

In a virgin silica core optical fiber, the intensity of the induced blue and red luminescence is proportional to the intensity of radiation. The intensity of the induced red luminescence is proportional to intensity of radiation regardless of age of the fiber. The intensity of the induced blue luminescence is proportional to the cumulative radiation history of the fiber. The radiation induced red lumineence (650 nm) is used to monitor the radiation level, and the radiation induced blue (450 nm) is used to measure the radiation cumulative dose.

OBJECTS OF THE INVENTION

It is an object of the invention to provide an optical fiber radiation detector and real-time dosimeter.

It is another object of the invention to provide a radiation detector and real-time dosimeter capable of detecting ionizing radiation from a remote distance.

It is a further object of the invention to provide a considerable length of silica core optical fiber disposed in or about an area susceptible to ionizing radiation for detecting the presence and cumulative dosage of such radiation.

It is a still further object of the invention to provide a considerable length of silica core optical fiber in an area such that when exposed to ionizing radiation the optical fiber luminesces in two distinct emission bands, blue at around 450 nm and red at around 650 nm.

It is yet another object of the invention to provide ionizing radiation induced liminescence from the ends of silica core optical fibers, and separate that luminescence into two distinct emission bands, blue at around 450 nm and red at around 650 nm, with the intensity of the red being proportional to instantaneous radiation and the intensity of the blue being proportional to both instantaneous radiation and cumulative radiation.

Other objects of the invention will become apparent to one upon acquiring a familiarity with the invention as disclosed in this specification and claims when considered in conjunction with the drawings herein.

DETAILED DESCRIPTION

It has been discovered that OH content silica core optical fibers under ionizing radiation luminesce in two emission bands with peaks centered at around 450 nm and 650 nm.

Figure 1:
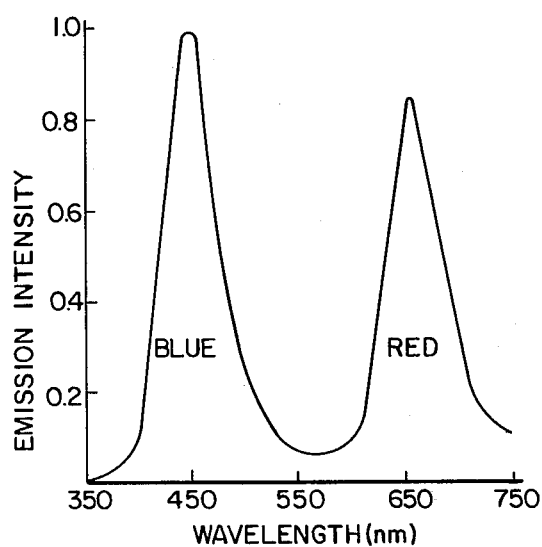
FIG. 1 represents a luminescence spectrum produced in a silica core optical fiber exposed to ionizing radiation.
Figure 2:
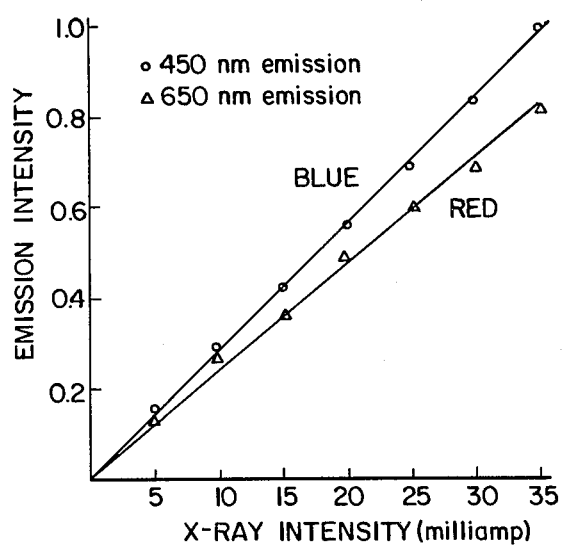
FIG. 2 represents emission intensities in a silica core optical fiber at peak wavelengths of 450 nm and 650 nm as a function of excitation intensity.

FIG. 1 shows the emission spectrum from a previously unirradiated polymer clad silica core optical fiber under excitation with unfiltered 40 kV x-rays at room temperature. There are two bands of comparable intensity with peaks centered at about 450 nm and 650 nm, respectively. The linearity of the emission intensities of both bands, as a function of radiation excitation, is shown in FIG. 2. The data points correspond to alternate tuning of a monochromator to wavelengths of 450 nm and 650 nm for each value of radiation intensity. For a particular radiation intensity there is an immediate or instantaneous luminescence emission intensity.

Figure 3:
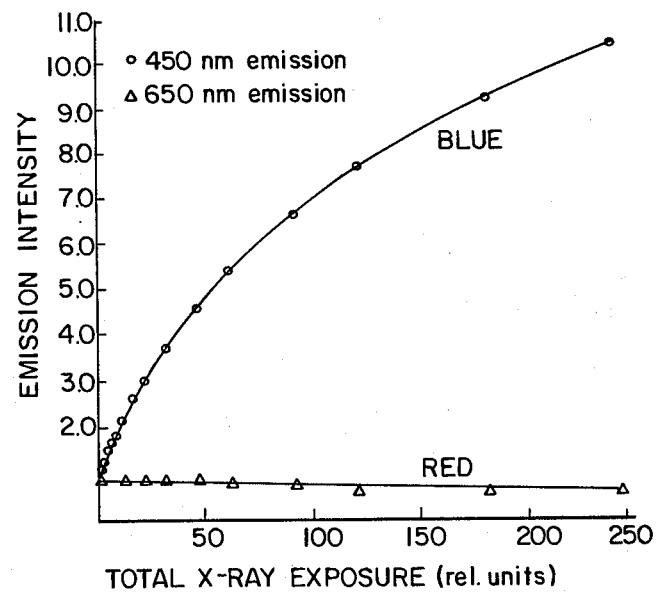
FIG. 3 represents emission intensities in a silica core optical fiber at peak wavelengths of 450 nm and 650 nm as a function of total X-ray or cumulative exposure.

Another significant feature of the discovery is illustrated by the data in FIG. 3. This figure illustrates the excited emission intensities at the peak wavelengths of 450 nm (blue) and 650 nm (red) as a function of cumulative radiation exposure. The abscissa is in minutes of 40 kV x-ray exposure at a dose rate of $1.4 \times 10^5$ rads/min. As illustrated in FIG. 3, intensity of the red luminescence decreases with exposure to about 75% of its initial value for maximum cumulative exposure of $3.4 \times 10^7$ rads. The reason for this decrease in emission intensity with cumulative exposure is not fully understood, but this does not effect its employment in providing a dosimeter according to the invention disclosed herein. In contrast to the decreasing emission of red luminescence, the intensity of blue emission increases as illustrated in FIG. 3 for a like cumulative exposure. The rate of increase of emission intensity is greatest at low doses of radiation and approaches saturation at higher doses.

The discovered behavior of the radiation induced luminescence illustrated in FIG. 3 lends itself to practical application in the form of a dosimeter for monitoring the presence of ionizing radiation and measuring the cumulative doses. The 650 nm emission provides the basis for detecting radiation. The ratio of the 450 nm emission intensity to the 650 nm emission intensity provides information on the exposure or cumulative dose which the optical fiber receives. An instrument so constructed is adapted to reveal both the presence of ionizing radiation and accumlated exposure. In contrast to an optical fiber dosimeter based on absorption of light transmitted through its core, the present invention employs radiation induced luminescence and has the advantage of not requiring an auxiliary light.

Figure 4:
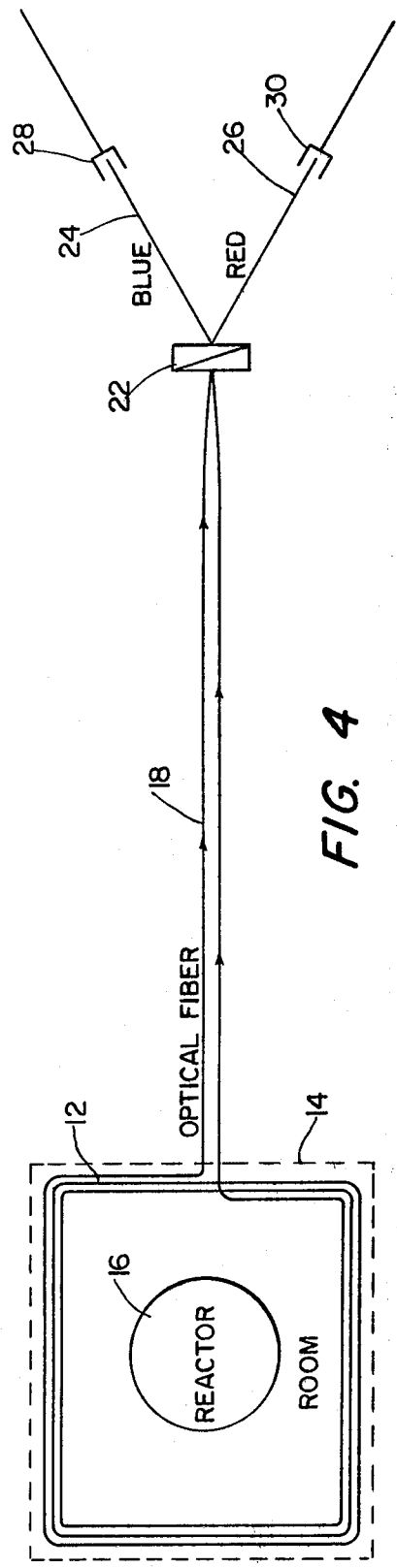
FIG. 4 illustrates a practical application of a dosimeter constructed according to the present invention when a considerable length of optical fiber is disposed about a reactor for both detecting the presence of and measuring cumulative doses of ionizing radiation which may leak therefrom.
Figure 5:
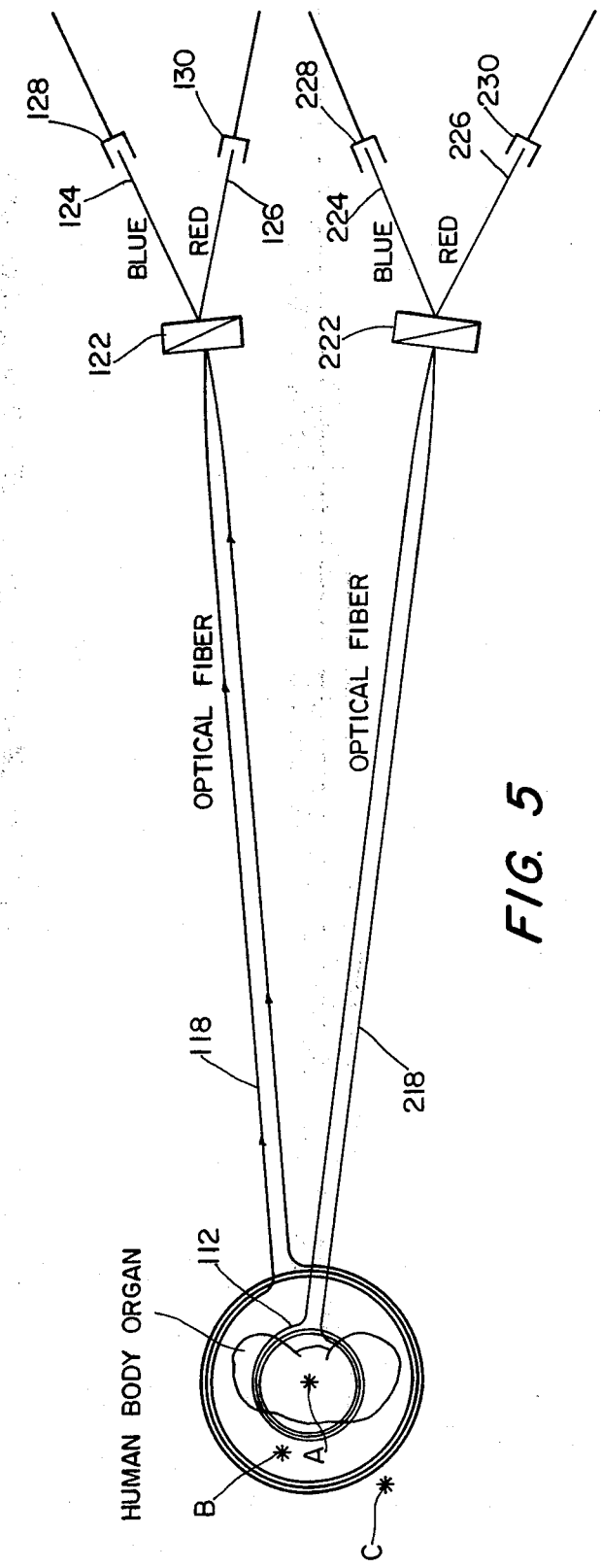
FIG. 5 illustrates a pair of concentrically disposed open core optical fiber windings disposed about a human body organ for use as an aid in directing radiation treatment.

This invention has practical application for monitoring radiation from around reactors, accellerators and waste storage areas as illustrated in FIG. 4, and for medical applications in defining an area of radiation on a human body organ or tissue as illustrated in FIG. 5. For remote monitoring of potential radiation, such as from a reactor as illustrated in FIG. 4, the optical fiber acts both as a radiation sensing element and as a transmission link to a location remote therefrom. The intensity of the luminescence from one end of the optical fiber may be measured at the remote location, or the luminescence from both ends may be combined and measured.

Referring further to FIG. 4, there is illustrated a considerable length of silica core optical fiber 12 which is disposed about the inner periphery of shielded room 14 in surrounding proximity to a reactor 16 housed therein. Lengths 18 of the optical fiber extend from room 14 to a remote location where they terminate in ends adjacent to a grating monochromator 22. Radiation induced luminescence emitted from the ends of the optical fiber is received by the grating monochromator and divided into the blue and red bands 24 and 26, respectively, illustrated in FIG. 4. Photodetector 28 measures the intensity of the blue light and photodetector 30 measures the intensity of the red light. These intensities provide information on the type of radiation received by the optical fiber. The intensity of the red luminescence, for example, indicates the immediate presence of ionizing radiation, because, as shown in the graph of FIG. 3, its emission intensity it not increased with exposure. The intensity of the blue luminescence, on the other hand, does increase with exposure as shown in FIG. 3, and, therefore, indicates cumulative doses of ionizing radiation.

The arrangement in FIG. 5 illustrates a medical use of the invention. Its arrangement is similar to that of FIG. 4. As shown in FIG. 5, a first link of polymer clad OH content silica core optical fiber 112 is wound about a small open core with lengths 118 extending a distance therefrom and terminating at a grating monochromator 122. As described with reference to the previous embodiment, the grating monochromator divides the luminescence received from the end (or ends) of the fiber into separate bands of blue and red beams 124 and 126, respectively. Photodetectors 128 and 130, respectively, measure the intensities in each of these beams. As previously described with reference to the FIG. 4 embodiment, the intensity of the red light provides an indication of present radiation on the optical fiber coil 112, and the intensity of the blue light indicates cumulative radiation thereon. A second link of optical fiber 212 is wound into a larger open air coil concentrically surrounding coil 112 and, likewise, has end portions 218 extending a distance from the coil to terminate at grating monochromator 222. This grating monochromator acts in the same manner as described before by dividing the optical fiber luminescence into blue and red beams 224 and 226, the intensities of which are measured by photodetectors 228 and 230. Again, the red luminescence indicates instantaneous radiation on the optical fiber forming coil 212 and the blue luminescence indicates cumulative radiation thereon.

In the medical application as illustrated in FIG. 5, optical fiber coils 112 and 212 are adapted to be arranged in front of and circumscribe an area of human body tissue or organ, for example, which is to receive radiation treatment at a precise area "A". The position of the directed radiation and its cumulative dosage can be readily monitored from an indication of which optical fiber coil receives the greater amount of radiation. When treatment radiation is concentrated at desired area "A", more radiation is received in coil 112 than in coil 212 and accordingly the intensities of the blue and red light measured by photodetectors 228 and 230 will be greater than the intensities measured by photodetector 128 and 130. In this instance, it will be known that the radiation is falling substantially within the area bound by coil 112. If radiation treatment is misdirected into the area "B", for example, substantially equal luminescence occurs at the detectors because the fibers of coil 112 and 212 would be receiving substantially equal radiation. On the other hand, radiation misdirected to area "C" would result in more radiation received by the fibers of coil 212 than by the fibers of coil 112. This results in higher intensities measured by photodetectors 128 and 130.

There has been described an invention defining an optical fiber radiation induced luminescence defining a real-time dosimeter. A device according to the invention may be used alone or in tandem with an optical fiber radiation absorption dosimeter or other conventional dosimeter for permanent recording.

While the invention has been particularly shown and described with reference to specific arrangements and embodiments thereof, it will be appreciated by those skilled in the art that various changes in form and detail may be made therein without departing from the spirit of the invention which is limited only by the scope of the claims annexed hereto.

What is claimed is:

1. A method of monitoring an area for the presence of ionizing radiation and measuring its accumulated dosage comprising:
    providing a considerable length of silica core optical fiber in proximity to an area susceptible of receiving ionizing radiation, whereby, said optical fiber upon receiving ionizing radiation, luminesces at its ends substantially only in combined blue and red having peaks at around 450 nm and 650 nm, respectively;
    dividing optical fiber end luminescence into two separate beams at near 450 nm and 650 nm, respectively; and,
    measuring the intensity of the divided beams in which the intensity of red luminescence indicates the immediate presence of ionizing radiation and the intensity of blue luminescence indicates accumulated dosage of ionizing radiation.

2. The method according to claim 1 further defined by combining luminescence from both ends of the optical fiber before power dividing.

3. The method according to claim 2 further defined by positioning both ends of the optical fiber side by side for combining their luminescence.

4. The method according to claim 1, 2 or 3 further defined by arranging the optical fiber in surrounding proximity to a reactor.

5. The method according to claim 4 further defined by arranging the optical fiber about the inside of a room housing a reactor.

6. The method according to claim 5 further defined by extending at least one end of the optical fiber to outside the reactor room.

7. The method according to claim 5 further defined by extending both optical fiber ends to outside the reactor room.

8. The method according to claim 1, 2 or 3 further defined by deploying plural discrete lengths of the optical fibers in loops positioned concentrically in front of a human body organ or tissue to be irradiated for determining the area of radiation concentration.

9. A dosimeter for monitoring an area for the presence of ionizing radiation and measuring its accumulated dosage comprising:
    a considerable length of silica core optical fiber disposed in proximity to an area susceptible of receiving ionizing radiation,
    said optical fiber, upon receiving ionization radiation, luminescing at its ends substantially only in combined blue and red having peaks at around 450 nm and 650 nm, respectively;
    grating monochromator means for receiving the combined luminescence from at least one of the optical fiber ends and dividing it into separate beams of blue and red;
    detector means for measuring the intensity of the divided beams;
    whereby the intensity of the red beam indicates the immediate presence of ionizing radiation and the intensity of the blue beam indicates accumulated dosage of ionizing radiation.

10. The invention according to claim 9 further defined by the power divider means receiving combined luminescence from both ends of the optical fiber.

11. The invention according to claim 10 further defined by positioning both ends of the optical fiber side by side for combining their luminescence.

12. The invention according to claim 9, 10 or 11 further defined by the optical fiber being disposed in surrounding proximity to a reactor.

13. The invention according to claim 12 further defined by the optical fiber being disposed about the inside periphery of the reactor room.

14. The invention according to claim 13 further defined by at least one end of the optical fiber extending to outside the reactor room.

15. The invention according to claim 13 further defined by extending both optical fiber ends to outside the reactor room.

16. The invention according to claim 9, 10 or 11 further defined by the optical fiber comprising plural discrete lengths wound in concentric open core loops positioned concentrically in front of a portion of a human body organ or tissue to be irradiated for determining area of radiation concentration.

17. A method of monitoring an area for the presence of ionizing radiation and measuring its accumulated dose comprising:
    providing at least one length of silica core optical fiber disposed proximately to an area susceptible of receiving ionizing radiation, whereby said optical fiber, upon receiving ionizing radiation luminesces at its ends substantially only in combined blue and red having peaks at around 450 nm and 650 nm, respectively;
    dividing the luminescence from at least one of the optical fiber ends to form at least one beam, said beam being for one of said peaks, e.g. the blue at near 450 nm or the red at near 650 nm; and
    measuring the intensity of said beam, whereby the intensity of red luminescence indicates the instantaneous level of ionizing radiation and the intensity of the blue luminescence indicates the cumulative radiation dose to said optical fiber.

18. A dosimeter for monitoring an area for the presence of ionizing radiation and measuring its accumulated dose comprising:
    at least one length of silica core optical fiber disposed proximately to an area susceptible of receiving ionizing radiation, said optical fiber upon receiving ionizing radiation luminescing at its ends substantially only in combined blue and red having peaks at around 450 nm and 650 nm, respectively;
    grating monochromator means for receiving the luminescence from at least one of the optical fiber ends and forming at least one beam, said beam being for one of said peaks, e.g. the blue at about 450 nm or the red at about 650 nm; and
    detector means for measuring the intensity of said beam, whereby the intensity of the red beam indicates the instantaneous level of ionizing radiation and the intensity of the blue beam indicates the cumulative radiation dose.

* * * * *